United States Patent Office 3,384,606
Patented May 21, 1968

3,384,606
CROSSLINKING AQUEOUS POLYURETHANES
WITH FORMALDEHYDE
Dieter Dieterich and Erwin Muller, Leverkusen, Germany, assignors to Farbenfabriken Bayer Aktiengesellschaft, Leverkusen, Germany, a German corporation
No Drawing. Filed Mar. 10, 1964, Ser. No. 350,651
Claims priority, application Germany, Mar. 13, 1963,
F 39,240
6 Claims. (Cl. 260—29.4)

This invention relates to polyurethane plastics and more particularly to polyurethane plastics which have good resistance to high temperatures.

It has been proposed heretofore to cross link polyurethane prepolymer type compositions with formaldehyde. In the heretofore known method, paraformaldehyde is combined together with a strong catalyst with a polyurethane millable gum on a rubber mill or into a solid perpolymer in heavy duty mixing equipment and the resulting composition is then subjected to heat and pressure. The heat and pressure causes monomeric formaldehyde to be liberated and cross link the polyurethane by reaction with the free —NCO groups. Heretofore, it has not been possible to cross link polyurethane compositions with formaldehyde without the necessity of applying heat and pressure. It has not been possible to cross link heretofore known polyurethane compositions with formaldehyde from solutions which contain at least predominant quantities of water.

It has been proposed heretofore to prepare aqueous solutions or dispersions of polyurethanes. The elastomeric polyurethane plastics resulting from shaping of these solutions by evaporation of the water have poor hydrolytic stability.

It is, therefore, an object of this invention to provide improved polyurethane plastics which are shaped from an aqueous dispersion. Still another object of this invention is to provide improved methods for the preparation of polyurethane plastics. Another object of this invention is to provide polyurethane plastics prepared from aqueous solutions or dispersions which have improved hydrolytic stability. Still another object of this invention is to provide polyurethane plastics prepared from aqueous solutions or dispersions of salt-like polyurethane compositions which have improved resistance to boiling water and improved mechanical properties. Another object of this invention is to provide an improved method of cross linking aqueous dispersions of salt-like polyurethane plastics while shaping and evaporating the solvent in the absence of excessive heat and pressure.

The foregoing objects and others are accomplished in accordance with the invention, generally speaking, by providing polyurethane plastics prepared from mixtures of a formaldehyde and an aqueous solution or dispersion of a polyurethane. Therefore, this invention contemplates formaldehyde cross linked salt-like elastic synthetic polyurethane plastics which have improved resistance to boiling water and good mechanical properties. It is preferred in accordance with the invention to mix a formaldehyde which includes formaldehyde yielding substances at a temperature of from about room temperature to about 150° C. with an aqueous solution or dispersion of a salt-like polyurethane which has a pH of above about 2. The mixture is then heated to remove the water and any other solvent while shaping the resulting polyurethane plastic, preferably to a temperature above about 20° C. but a maximum of about 150° C. which brings about formation of a cross linked polyurethane polymer.

The heretofore known salt-like polyurethanes disclosed in copending applications Ser. No. 318,197 and Ser. No. 327,793 are preferred as materials to be additionally cross linked with formaldehyde in accordance with this invention. Accordingly, the present invention includes polyurethane plastics which may be sheet-like structures, coatings, castings, or the like prepared by adding a formaldehyde to the aqueous solution or dispersion of polyurethane compositions disclosed in the above-identified applications either before, after or during the production of the aqueous solution or dispersion and then the water is removed preferably at temperatures between about 20° C. and about 150° C. while shaping or depositing the resulting elastic synthetic polyurethane plastic. In addition to the particular materials disclosed, any suitable linear or branched polyurethane composition which has in some way been made water-soluble or at least capable of dispersion in an aqueous solution may be used. Suitable polyurethane compositions therefore are formed in the usual manner by reacting an organic polyisocyanate and, if desired, a chain extender which is an organic compound having active hydrogen containing groups as determined by the Zerewitinoff method and preferably has a molecular weight below about 400. The organic polyol preferably has a molecular weight of from about 400 to about 10,000.

Any suitable organic polyol may be used including, for example, hydroxyl polyethers, hydroxyl polyesters, hydroxyl polyacetals, hydroxyl polyesteramides, hydroxyl polythioethers or the like. Any suitable hydroxyl polyether may be used including for example polyhydric polyalkylene ethers such as polymerized products of tetrahydrofuran, propylene oxide, ethylene oxide, butylene oxide and the like alone to prepare the corresponding polyalkylene ether glycols such as polypropylene ether glycol having a molecular weight of 2,000, polytetramethylene ether glycol having a molecular weight of 2,000 as well as copolymerization and graft polymerization products of these compounds. It is also possible to use individual or mixed polyhydric polyethers which are obtained, for example, by condensation of 1,6-hexanediol, 2-methylhexane-1,6-diol, 1,7-heptanediol, 1,8-octanediol or the like with the alkylene oxides set forth above and preferably propylene oxides bases with the addition of 10 to 30 percent of lower glycols such as propylene glycol, ethylene glycol, 1,4-butanediol and the like. It is possible to use mixed alkoxylated glycols, for example, those compounds which contain both oxypropylene and oxyethylene groups, especially a polypropylene glycol having a molecular weight of about 2,000 reacted with 2 mols of ethylene oxide. The polyether may contain a quaternizable group for formation of the salts to be used in accordance with the invention. In this case, quaternizable polyethers may be prepared by alkoxylating an active hydrogen containing compound which has a tertiary amino group. Particularly preferred are propoxylated glycols with tertiary amino groups, for example, propoxylated N-methyl diethanolamine or alkoxylated primary amines such as, for example, alkoxylated aniline, toluidine, hydrazine or the like and especially propoxylated aniline having a molecular weight of 2,000, propoxylated toluidine having a molecular weight of 2,000, propoxylated hydrazine having a molecular weight of 500 and the like. As examples of polyhydric polyesters one may use the condensation product of any suitable polycarboxylic acid with any suitable polyhydric alcohol if desired with the concurrent use of diamines and amino alcohols to prepare polyester amides. Any suitable polycarboxylic acid may be used such as, for example, adipic acid, succinic acid, phthalic acid, terephthalic acid, mellitic acid, benzene tricarboxylic acid or the like. Any suitable polyhydric alcohol may be used such as, for example, ethylene glycol, diethylene glycol, 1,3-propanediol 1,4-butanediol, trimethylolpropane, 1,2,6-hexanetriol or the like. Any suitable diamine may be used such as, for example, ethylene diamine, 1,4-butane diamine and the like. Any suitable amino alcohol may be used such as, for example, N-methyl diethanolamine and the like in order to have tertiary amino groups in the final product. Any suitable polyacetal may be used including both the water-soluble types from lower glycols and ether glycols and formaldehyde such as, for example, ethylene glycol, diethylene glycol and the like reaction products with formaldehyde. The polyacetals may also be the water-repellent types such as, those from high glycols, for example, 1,6-hexanediol and formaldehyde. Any suitable polyhydric polythioether may be used such as, for example, the condensation product of thiodiglycol with itself or with other glycols including those which contain tertiary amino groups such as, for example, ethylene glycol, 1,4-butanediol, and the like or N,N-di-(hydroxy ethyl)-aniline.

Any suitable organic polyisocyanates may be used including all aliphatic and aromatic polyisocyanates and preferably diisocyanates such as those known to be highly active, such as naphthylene-1,5-diisocyanate, diphenyl-methane - 4,4' - diisocyanate, dibenzyl - 4,4'-diisocyanate, phenylene - 1,3 - diisocyanate, phenylene-1,4-diisocyanate and toluylene diisocyanates, such as, for example, a mixture of 80 percent 2,4- and 20 percent 2,6-toluylene diisocyanate or the like. Less reactive diisocyanates such as tetraalkyl diphenylmethane diisocyanates, dicyclohexyl methane diisocyanate and aliphatic diisocyanates such as hexamethylene diisocyanate offer the advantage of supplying reaction products having a substantially linear structure.

Any suitable chain extender may be used such as, for example, ethylene glycol, propylene glycol, 1,4-butane diol and higher polyhydric alcohols such as trimethylolpropane as well as amino alcohols and diamines such as diethanolamine, ethylene diamine, N,N-dimethyl propylene diamine and the like. It is also possible to use chain extending agents, especially the above mentioned glycols and diamines which also contain tertiary nitrogen atoms such as, for example, N-methyl diethanolamine, N-butyl diethanolamine, N-oleyl diethanolamine, N,N-di-(hydroxyethyl) - aniline, N,N - di(hydroxyethyl) - toluidine, N,N-di-(hydroxyethyl)-mesidine, N-alkyl diisopropanolamines such as N-methyl diisopropanolamine, N-aryl-diisopropanolamines such as N-phenyl diisopropanolamine N,N-di-(hydroxyethyl)-piperazine, N-methyl-bis-(aminopropyl)-amine and the like.

The organic polyol, polyisocyanate and, if desired, the chain extending agent, are mixed together and reacted by any suitable order of addition. The polyisocyanate may be used in a quantity either greater or less than a stoichiometric quantity or exact stoichiometric amounts may be used based on the active hydrogen atoms in the organic polyol and the chain extender. It is preferred to employ approximately stoichiometric quantities of an organic diisocyanate so that a millable composition is obtained. The reaction between these components may take place in the absence of a solvent or it may be carried out in the presence of an inert organic solvent including hydrocarbons such as aromatic hydrocarbons, for example, benzene or halogenated hydrocarbons such as chlorobenzene or ketones such as acetone, methyl ethyl ketone or esters such as ethyl acetate or any other suitable inert organic solvent.

In some cases the reaction between the organic polyol and the organic polyisocyanate leads directly to water soluble polyurethane compositions, for example, where there is a predominant use of polyethylene glycol or polyacetals from formaldehyde and ethylene glycol or oligo ethylene glycols as the organic polyol component. When using water repellent reactants, a sufficient hydrophilic nature can be imparted to the final product by using at least one component which contains tertiary nitrogen which is quaternized during the reaction or is transformed by means of acid into a salt. In this case the polyurethane which is formed contains tetrabonded nitrogen atoms. The quaternization can take place in a solvent at room temperature or at high temperature and possibly even under pressure. Suitable solvents are especially the polar solvents such as the alcohols, ketones and cyclic ethers, for example, ethanol, isopropanol, acetone, methyl ethyl ketone, dioxane and the like which are preferably miscible with water. If the initial polyurethane composition contains a tertiary nitrogen atom it is preferred to use a monofunctional quaternization agent for the purpose of rendering the polyurethane water soluble or dispersible.

Examples of monofunctional quaternization agents are ethyl chloride, methyl bromide, dimethyl sulphate, diethyl sulphate, benzyl chloride, p-nitrobenzyl chloride, benzyl bromide, ethylene chlorohydrin, ethylene bromohydrin, epichlorohydrin, bromobutane or p-toluene sulphonic acid esters. Triethylamine, diethylethanolamine, trimethylamine, pyridine or quinoline are mentioned as examples of tertiary amines. These agents are monofunctional in the sense that they have only one quaternizing or alkylating group.

It is also quite possible to use concurrently a polyfunctional quaternizing agent, i.e. a polyfunctional alkylation agent or a polyfunctional tertiary amine. The quantity should not exceed 50 percent of the total quantity of quaternizing agent, preferably 5 to 15 percent.

The quantity of monofunctional alkylation agent or monofunctional tertiary amine which is used depends on the number of the quaternizable groups present in the polyurethane composition which is preferably in solution. An excess is useless. Nevertheless, it is possible to use less than the calculated quantity of monofunctional quaternizing agent in order to vary the subsequent degree of cross-linking. If a bifunctional quaternizing agent is additionally used, this is generally not to exceed about 0.2 to about 0.8 percent of the weight of the polyurethane composition which is in solution. The quaternizing agent or the mixture of quaternizing agents can be simply introduced into the solution, possibly even in dissolved form.

It is quite possible for the solvent to be mixed from the outset with water, but care should be taken that the water which is present does not restrict the solubility of the polyurethane composition. After effecting quaternization, the organic solvent can be partially or even completely replaced by water. Those solutions which contain about 80–100 percent of water in the solvent are also of particular interest.

Still another way of making the water repellent compositions sufficiently hydrophilic in nature so that they may be used in accordance with the method of the present invention is to react the polyurethane which contains one or more tertiary nitrogen atoms with an acid which preferably has a pK value of a maximum of 6 and preferably a maximum of 4 to convert it to the corresponding salt, which is then hydrophilic. This process is also preferably carried out in a polar solvent. Most mineral acids and many organic acids especially carboxylic and sulphonic acids are suitable for the compound which has a pK value of a maximum of 6, indeed most of these acids have a pK value of a maximum of 4.

Some specific compounds which are suitable for the formation of the salt are, for example, hydrofluoric acid, hydrochloric acid, hydrobromic acid, chloric acid, perchloric acid, sulphurous acid, sulphuric acid, thiosulphuric acid, selenous acid, nitric acid, hypophosphorous acid, phosphorous acid, phosphoric acid, arsenic acid, cyanic acid, fluoroboric acid, fluorosilicic acid, hexachloroantimony acid, hexachlorostannic acid, chromic acid, fluorosulphonic acid, peroxy disulphonic acid, amidosulphonic acid, hydroxylamine monosulphonic acid, hydrazine disulphonic acid, sodium hydrogen sulphate, potassium hydrogen fluoride, sodium dihydrogen phosphate, sodium dihydrogen fluorosilicate, aluminum hydrogen sulphate.

Formic acid, chloroacetic acid, dichloracetic acid, trichloroacetic acid, chlorobromoacetic acid, bromoacetic acid, tribromoacetic acid, trifluoroacetic acid, sulphoacetic acid, cyanacetic acid, methoxyacetic acid, ethoxyacetic acid, sulphodiacetic acid, trisulphidoacetic acid, alpha, alpha'-dimethyl thinonyl diacetic acid, nitrilo triacetic acid, ethylene diamine tetra-acetic acid, glycolic acid, diglycolic acid, thioglycolic acid, thiodiglycolic acid, methylene-bis-thioglycolic acide, methyl sulphonyl acetic acid, ethyl sulphonyl propionic acid, beta-chloro-propionic acid, methane sulphonic acid, ethane sulphonic acid, formamidine sulphonic acid, 2-chloroethane sulphonic acid, 2-hydroxyethane sulphonic acid, acetone monosulphonic acid, lactic acid, trichlorolactic acid, malonic acid, oxalic acid, succinic acid, malic acid, maleic acid, fumaric acid, chloromaleic acid, bromofumaric acid, dimethyl fumaric acid, dihydroxymaleic acid, dihydroxyfumaric acid, dibromosuccinic acid, aconitic acid, mesaconic acid, citraconic acid, itaconic acid, tartaric acid, dihydroxy tartaric acid, mucic acid, saccharic acid, oxaluric acid, tetrolic acid, pyroracemic acid, acetyl pyroracemic acid, acetylene dicarboxylic acid, azidodithiocarboxylic acid, glyoxime dicarboxylic acid, glycerine boric acid, pentaerythritol boric acid, mannitol boric acid, nitro malonic ester, isonitrosoacetic acid ester, methyl nitrolic acid, cyanoform, 2-phenol sulphonic acid, 3-phenol sulphonic acid, 4-phenol sulphonic acid, 2,4-phenol disulphonic acid, pentachlorophenol, picric acid, o-chlorobenzoic acid, m-chlorobenzoic acid, p-chlorobenzoic acid, o-bromobenzoic acid, o-fluorobenzoic acid, 2,5-dichlorobenzoic acid, tribromobenzoic acid, 5-chloro-2-hydroxy benzoic acid, salicyclic acid, 2,6-dihydroxybenzoic acid, o-nitrososalicyclic acid, o-nitrobenzoic acid, 3,5-dinitrobenzoic acid, benzene sulphonic acid, p-toluene sulphonic acid, benzene-1,2,4,5,-tetracarboxylic acid, m-sulphobenzoic acid, p-sulphobenzoic acid, benzoic acid (1)-disulphonic acid-(3,5), 2-chlorobenzoic acid-(1)-sulphonic acid-(4), 2-hydroxybenzoic acid-(1)-sulphonic acid-(5),5,5'-methylene disalicyclic acid, sulphanilic acid, o-sulphaminobenzoic acid, protocatechuic acid, alpha-resorcylic acid, beta-resorcylic acid, hydroquinone-2,5-dicarboxylic acid, gallic acid, alpha-chlorocinnamic acid, phenyl sulphonyl acetic acid, phenyl thioglycolic acid, phenyl thionyl acetic acid, taurocholic acid, phenyl glyoxalic acid, 4-chloro-2-methyl phenoxyacetic acid, diphenyl ether disulphonic acid, N-phenyl amino methane sulphonic acid, 4,6-dichloroaniline-2-sulphonic acid, 1,3-phenylene diamine-4,6-disulphonic acid, benzaldehyde-2-sulphonic acid, benzaldehyde-4-sulphonic acid, benzaldehyde-2,4-disulphonic acid, diphenylamine sulphonic acid, 2-nitrodiphenyl amine sulphonic acid, phthalic acid, tetrachlorophthalic acid, 4-chlorophthalic acid, 3,6-dichlorophthalic acid, 3-nitrophthalic acid methyl ester, phthalimidoacetic acid, phthaluric acid, 4-sulphophthalic acid, isophthalic acid, 4-nitro isophthalic acid, 4-nitro isophthalic-1-methyl ester acid, 4-hydroxyisophthalic acid, 4-6-dihydroxy isophthalic acid, terephthalic acid, nitro terephthalic acid, oxyterephthalic acid, dichloroterephthalic acid, tetrachloroterephthalic acid, 2,5-dihydroxy-p-quinone, naphthalene-1-sulphonic acid, naphthalene-2-sulphonic acid, di-n-butyl naphthalene sulphonic acid, 2,6-naphthalene disulphonic acid, 1-naphthol sulphonic acid, 1-naphthol-2,4-disulphonic acid, 1-naphthol-2,5-disulphonic acid, 1-naphthol-3,6-disulphonic acid, 8-chloro-1-naphthol-3,6-disulphonic acid, 1,8-naphthsultone sulphonic acid, 1-naphthol-3,6,8-trisulphonic acid, 2-naphthol-6-sulphonic acid, 2-naphthol-1-sulphonic acid, 2-naphthol disulphonic acid, 2-naphthol trisulphonic acid, 1,7-dihydroxy-3-naphthalene sulphonic acid, 2,3-dihydroxy-6-naphthalene sulphonic acid, 1,8-dihydroxy-2,4-naphthalene disulphonic acid, chromotropic acid, naphthalene-1,4,5,8-tetracarboxylic acid, 4-naphthalic acid phenyl sulphone, 5,6,7,8-tetrahydro-2-naphthol-3-carboxylic acid, 1-hydroxy-2-naphthoic acid, 2,8-dihydroxy-3-naphthoic acid, 2-hydroxy-3-naphthoic acid-6-sulphonic acid, N-acetyl-1-naphthylamine-3-sulphonic acid, naphthylamine disulphonic acid, naphthyl-amine trisulphonic acid, naphthsultam-1,8-sulphonic acid, oxytoluylic acid, o-tolylamido-diacetic acid, beta-naphthylamido-diacetic acid, 4,4'-di-p-amino benzoyl amino diphenyl urea-3,3'-disulphonic acid, phenyl hydrazine-2,5-disulphonic acid, 2,3-dimethyl-4-amino azobenzene-4',5-disulphonic acid, 4'-aminostilbene-2,2'-disulphonic acid-(4-azo-2-) naphthylamine-1-sulphonic acid-(4), 2-methylindol sulphonic acid, carbazole-2,7-disulphonic acid, 2-hydroxycarbazole-7-sulphonic acid, quinolinic acid, quinolin sulphonic acid, 2-(4'-amino phenyl)-benzthiazole-carboxylic acid-6-sulphonic acid, cinchomeronic acid, 2,4-pyridine dicarboxylic acid, barbituric acid, violuric acid.

Polyurethane compositions dispersed in water can also generally be obtained by producing the polyurethane composition in an organic solvent preferably a solvent which is miscible with water, as more particularly set forth above. But after the water dispersible and preferably hydrophilic intermediate polyurethane product has been prepared it is preferred to substantially remove the organic medium so that an aqueous solution or dispersion which may be obtained with the addition of emulsifiers is obtained. The concentration of polyurethane in the aqueous solution or dispersion does not play a significant part in the reaction provided that feasible amounts of the polymer are present.

In accordance with the main process of this invention, the polyurethane compositions which are dispersed or dissolved in water are then mixed with a formaldehyde and cross linked on removal of the water to prepare an improved water resistant polyurethane plastic which is stable even in boiling water. This is accomplished without the use of substantial heat or pressure. When formaldehyde is referred to in this application it is intended to include aqueous or dissolved or gaseous formaldehyde, also those substances which are able to split off formaldehyde under the reaction conditions or react even in the same manner as formaldehyde. Included therefore are methylol substituted carbon, nitrogen, phosphorous, oxygen and sulphur compounds as well as oligo functional and polyfunctional derivatives of methylol compounds, cyclic acetals of formaldehyde, methylol ethers, methylol acetates, methylol-N-acetals (Mannich bases), formals, urea formaldehyde and melamine-formaldehyde adducts, resoles, as well as the high molecular weight compounds prepared from these basic derivatives.

The following are mentioned as examples: trioxane, paraformaldehyde, methylal, methylol acetone, dimethylol acetone, trimethylol acetone, tetramethylol acetone, methylol malonic ester, methylol nitro-malonic ester, hydroxymethyl nitropropane, S-hydroxymethyl-p-tertiary butyl thiophenol, tris-hydroxymethyl phosphine, diphenyl-bis-hydroxymethyl phosphonium chloride, hexamethylene tetramine as well as methylol compounds, methylol ethers and methylol acetates of urea, ethylene urea, methylene diurea, diurea methylene ether, hexamethylene diurea, acetylene diurea, hydrazodicarbonamide, acrylamide and methacrylamide, as well as homopolymers and copolymers of these compounds, urones, e.g. tetra-hydro(1,3,5-oxydiazinone-(4), dimethyl-bis-ureidoethyl ammonium compounds, melamine, dicyandiamine, lauroylamide, stearylamide, 4-5-dihydroxy-tetrahydroimidazolone-(2), polymethylol polyvinyl alcohol, polyvinyl alcohol polyformal and the like.

The formaldehyde contemplated and preferred for use in accordance with this invention is therefore any compound which under the reaction conditions yields $CH_2O$, the simplest aldehyde.

The formaldehyde can be used as such or it or its precursors may be dissolved in organic solvents or water and then used. Moreover, it may be added to the polyurethane composition at any desired time even as a gas. In other words, it can be incorporated into a storable solution or dispersion of the polyurethane composition after it has been prepared or at any desired time just before the processing of the polyurethane composition to prepare the elastic synthetic polyurethane plastics of the invention. Moreover, it may be added to the polyurethane composition before it is made hydrophilic and converted into a solution or dispersion. Or, it may be added to the solvent before the polyurethane composition is added.

Depending on the pH of the aqueous solution of the polyurethane composition, it is possible to work without a catalyst. But in some cases it may be desirable to include a catalyst. When using polyurethane compositions, which have been quaternized with alkylation agents or made hydrophilic with inorganic or organic acids into salt-like polyurethane polymers with tetra bonded nitrogen atoms, it is readily possible to produce a pH value of at least 2 and preferably between about 2 and about 4 by adding a sufficient quantity of alkylation agent or acid without coagulation taking place. In such cases, it is possible to dispense with an additional catalyst.

However, when starting from a neutral solution, a catalyst is preferably added. For example, hydrochloric acid, nitric acid, fluoroboric acid, perchloric acid, oxlaic acid, tartaric acid, formic acid, p-toluosulphonic acid, dimethyl sulphate or benzoyl chloride, as well as complexes of Lewis acids with tertiary amines, e.g., the zinc chloride-quinoline complex and the like.

The pH of the aqueous solution containing the formaldehyde is preferably between about 2 and about 5. If the catalyst is added to the aqueous polyurethane solution or dispersion, then the addition should be accompanied by sufficient agitation so that there is no coagulation at the point where the acid catalyst strikes the polyurethane composition. Coagulation will often occur if the pH in a localized area falls below about 2. Conversely, coagulation can be consistently avoided if the pH of the solution at all points is maintained above about 2. This can also be achieved by adding compounds which only form acids after combination with water, for example, dimethyl sulphate, acid chlorides or the like. It is also possible to add cationic or neutral emulsifiers to aid the dispersion of the polyurethane compositions.

The ease with which the required cross linking reaction takes place depends to a very substantial degree on the concentration of the polyurethane composition and the nature and quanity of the cross linking agent, i.e., formaldehyde and the pH value which is controlled as necessary with the catalyst. The nature of the cross linking reaction is also influenced by the temperature at which the cross linking is carried out. Polyurethane compositions based on aromatic diisocyanates are the most difficult to react. These compositions require the lowest pH values, all other conditions remaining the same. Polyurethane compositions based on aliphatic diisocyanates react more readily, i.e. the formaldehyde cross linking at a pH of about 2 occurs at room temperature. The cross linking is even more greatly facilitated by the incorporation of urea groups or aromatically bonded tertiary amino groups which react preferably with formaldehyde, for example, by means of di-(hydroxyethyl)-meta-toluidine. The quantity of formaldehyde used for cross linking may vary over wide limitations. It is preferred to use from about 0.5 to about 10 percent by weight based on the solid content of the solution or dispersion of free formaldehyde. Amounts above about 10 percent by weight reduce the elastic properties of the polyurethane plastic product. But it should also be borne in mind that often when using ketones, formaldehyde or an aqueous solution of formaldehyde, some of the formaldehyde is removed due to evaporation and is not available for reaction.

According to the invention, the mixture of the polyurethane composition and formaldehyde is allowed to set at room temperature or higher temperature until the water and any other solvent is removed and the remaining polyurethane plastic is then ready for use. It may, in order to even further improve its hydrolytic stability and mechanical properties, be further heated to a temperature of from about 50 to about 150° C. for any suitable length of time, preferably about 2 to about 60 minutes.

The final products of the invention are elastic synthetic polyurethane products which, while they have a certain hydrophilic nature, nevertheless have good resistance to water even at relatively high temperatures. They are particularly suitable for coatings when deposited for example, on woods, metals such as steel, fabrics, such as cotton or used to impregnate fabrics for example, to make high-grade canvas. They may also be used as adhesion promoters for elastic films, foils and filaments. Furthermore, they make a good paper coating to improve the wet strength of paper bags or the like.

The invention is further illustrated by the following examples in which parts are by weight unless otherwise specified.

Example 1.—Production of the polyurethane composition

About 1 kg. of polypropylene glycol ether (OH number 56) is dehydrated for about 30 minutes at about 130° C. and stirred with about 266 g. of toluylene-2, 4-diisocyanate for about one hour at about 130 to about 140° C. After cooling to about 40° C., about 120 g. of N-methyl diethanolamine are added. The highly viscous melt is further heated for about 18 hours at about 100° C. The result is a polyurethane composition with a Defo hardness of 1900 and a Defo elasticity of 22.

About 450 g. of a 33.3 percent acetone solution of the polyurethane composition is obtained as starting material and are mixed with about 6 ml. of 40 percent aqueous formaldehyde and such a quantity of normal hydrochloric acid that a pH value of about 3 is reached (about 110 ml.). After adding about 300 ml. of water, acetone is extracted in vacuo. The aqueous plastic solution is poured onto glass plates and the water is evaporated at room temperature. The elastic foil which is obtained has a strength higher than 80 kp./cm.$^2$, but is still soluble in aqueous acetone. After a heat treatment at about 100° C. for about 10 minutes, the foil is insoluble in acetone. At the same time the elasticity is increased.

Example 2

The procedure of Example 1 is followed, but instead of adding the aqueous formaldehyde solution to the aqueous plastic solution, an aqueous solution of about 4 g. of hexamethylol melamine is added. The result is a water-insoluble elastic foil.

Example 3

The procedure of Example 2 is followed, but using about 5 g. of melamine hexamethylol methyl ether. The result is a water-insoluble elastic foil.

Example 4

The procedure of Example 2 is followed, but using about 5 g. of tetrahydro-1,3,5-oxadiazinone-(4)-N,N-dimethylol methyl ether (prepared from urea and formaldehyde in methanol). The result is a water-insoluble elastic foil.

Example 5.—Production of the polyurethane composition

About 800 g. of polypropylene glycol ether (OH number 56) are dehydrated for about 30 minutes at about 130° C. and mixed by stirring for about 30 minutes at about 130° C.. with about 341 g. of diphenylmethane diisocyanate. After cooling to about 40° C., about 200 g. of the above polypropylene glycol ether and about 100 g. of N-methyl diethanolamine are added all at once. The homogeneous melt is poured into molds and further heated for about 24 hours at about 100° C. Defo hardness 2750, Defo elasticity 28.

About 450 g. of a 33.3 percent acetone solution of the polyurethane composition obtained as starting material have normal hydrochloric acid added thereto until a pH value of about 3 is reached, the clear solution is then diluted with about 200 ml. of water and the acetone extracted in vacuo. A solution of about 6 g. of melamine hexamethylol methyl ether in methanol/water is then carefully added.

The resultant latex-like emulsion, when put on glass plates and after evaporation of the water at room temperature, forms foils with a milky turbidity which are highly elastic, have high tensile strength and excellent resistance to boiling water.

It is to be understood that the foregoing examples are given for the purpose of illustration and that any other suitable hydrophilic polyurethane composition, formaldehyde, catalyst or the like could have been used therein provided that the teachings of this disclosure are followed.

Example 6.—Production of the polyurethane composition 1 kg. of an adipic acid-hexane diol-polyester (OH number 64) is dehydrated in vacuo at 130° and stirred at 80° for 30 minutes with 1088 g. of toluylene diisocyanate. While cooling and stirring a solution of 400 g. of 1,4-butane diol and 120 g. of N-methyldiethanol amine in 1.6 l. of acetone is added to the melt. The solution reaches boiling temperature. After 2.5 hours the solution has become highly viscous and is diluted with 2 l. of acetone and held for three hours at 55° C. The result is a clear 47.8 percent solution of the polyurethane in acetone having at room temperature a viscosity of more than 100 stokes.

400 g. of the solution are heated to 50° C. for 30 minutes with 3.4 ccm. of dimethyl sulfate. Then 2 ccm. of acetic acid and 300 ccm. of water are added After distilling off the acetone a thinly liquid latex with a solid content of 44 percent is obtained.

The latex has been added thereto 11 percent (calculated on its solid content) of tetrahydropyrimidinon-dimethylol-methyl-ether. The pH value is brought with tartaric acid to 4 to 5. Cast onto glass plates the latex produces hard bright films which are soluble in 80 percent acetone. Heating for one hour at 90 to 100° C. results in an essentially harder film which is completely insoluble in organic solvents.

Example 7

The procedure is as in Example 6 but 45 percent of tetrahydropyrimidinon-dimethylol-methyl-ether are employed. The resulting films are still harder and brittle which swell only to a small degree in organic solvents.

Example 8.—Production of the polyurethane composition 250 g. of an adipic acid-hexane diol-polyester are dehydrated and reacted at 80° C. with 104 g. of 4,4'-diphenyl methane diisocyanate for 30 minutes. The melt is cooled to 40° C. and has added thereto 30 g. of N-methyl diethanol amine in 300 ml. of acetone. After 15 minutes a viscous solution is obtained which is diluted with 400 ml. of acetone. One hour later the reaction mixture is again diluted with 400 ml. of acetone. A 30.6 percent polyurethane solution is obtained having a viscosity of about 80 stokes.

300 g. of this solution are diluted with 500 ml. of acetone and stirred for four hours to 80° C. with 40 ccm. of methyl chloride. Then 50 ccm. of water are added making the resulting highly viscous solution again thinly liquid. After adding further 300 ccm. of water the acetone is distilled off in vacuo. A 20 percent aqueous colloidal polyurethane solution is obtained.

Samples of the aqueous polyurethane solution are reacted with 40 percent aqueous formaldehyde (I) and with aqueous tetrahydropyrimidinon-dimethylol-dimethyl-ether (II). The results are given in Table 1. The percentages are calculated on the solid content of the polyurethane solution as well as of the crosslinker solution. pH values less than 5 are balanced with tartaric acid. The solutions are cast and the films heated for the indicated time and temperature. Solubility is given in 80 percent aqueous acetone.

TABLE 1

| Crosslinker | pH | 1 h. 70° | ½ h., 90° | ½ h., 100° |
|---|---|---|---|---|
|  | 5.5 | Soluble | Soluble | Soluble. |
| 9.0% I | 5 | do | do | Partly crosslinked. |
| 9.0% I | 3 | do | Crosslinked | Crosslinked. |
| 12.5% II | 6 | do | Soluble | Soluble. |
| 12.5% II | 3 | do | Highly crosslinked. | Highly crosslinked. |

Example 9

The procedure is as in Example 8, but employing 5.7 ml. of dimethyl sulfate instead of methyl chloride to achieve quaternization of 300 g. of the polyurethane solution in acetone.

TABLE 2

| Crosslinker | pH | 1 h., 50° | 1 h., 70° | ½ h., 90° | ½ h., 100° |
|---|---|---|---|---|---|
| 1.6% II | 5 | Soluble | Slowly soluble. | Very slowly soluble. | Crosslinked. |
| 1.6% II | 3 | do | do | Highly crosslinked. | Highly crosslinked. |

Example 10.—Production of the polyurethane composition 250 g. of an adipic acid-hexane diol-polyester (molecular weight 2000) are dehydrated and reacted for one hour at 120° C. with 30.3 g. of 1,6-hexamethylene diisocyanate. At 70° C. a solution of 3 g. of N-methyl-diethanol amine in 170 ccm. of acetone is added to the melt which is held for five hours at 60° C. and then diluted with further 300 ccm. of acetone. The solution is reacted with 25 ccm. of methyl chloride for four hours at 80°, diluted with 500 ccm. of water and the acetone is distilled off. A milky opaque polyurethane latex with a solid content of 37 percent is obtained.

Crosslinking with formaldehyde is achieved as in Example 8.

TABLE 3

| Crosslinker | pH | 20° | 1 h., 50° | ½ h., 80° |
|---|---|---|---|---|
|  | 5 | Soluble | Soluble | Soluble. |
| 4% I | 5 | do | do | Crosslinked. |
| 4% II | 4 | do | Slowly soluble | Highly crosslinked. |

Comparison example

Crosslinking with formaldehyde of an usual polyurethane having no quaternary ammonium groups is performed by using a polyurethane prepared from an adipic acid-glycol-polyester, 4,4'-diphenylmethane diisocyanate and 5 percent of 1,4-butane diol. The polyurethane is dissolved in tetrahydrofurane to give a 20 percent opaque solution with a viscosity of 43 stokes. Even traces of trifunctional isocyanates produce crosslinking. Formaldehyde crosslinking is done as in Example 8. The results are given in Table 4.

TABLE 4

| Crosslinker | pH | 1 h., 80° | 1 h., 100° | 3 h., 130° |
|---|---|---|---|---|
| 9% I | Neutral | Soluble | Soluble | Soluble. |
| 9% I | About 3 | do | do | Do. |
| 12.5% II | do | do | do | Crosslinked. |

In the last instance at 100° C. the crosslinking agent reacts with itself to form an urea resin while the polyurethane remains completely soluble.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic polyol with an organic polyisocyanate, at least one of said reactants containing a tertiary nitrogen atom, in substantially stoichiometric quantities to prepare a polyurethane prepolymer, reacting said prepolymer with a member selected from the group consisting of a quaternization agent and an acid having a pK value of less than 6 to prepare a polyurethane, mixing said polyurethane with formaldehyde in an aqueous medium to form a dispersion having a pH value of 2 to 5 and heating said mixture to remove water and leave an elastic synthetic polyurethane plastic having improved mechanical properties and improved resistance to boiling water by heating said mixture to a temperature of from about 20 to about 150° C.

2. The polyurethane plastic of claim 1 wherein said formaldehyde is present in an amount of from about 0.5 to about 10 percent by weight based on the solid content of said aqueous dispersion.

3. A polyurethane plastic prepared by a process which comprises forming an aqueous dispersion of a self dispersion polyurethane containing salt groups, mixing said polyurethane with formaldehyde in an aqueous medium having a pH value of from about 2 to about 5 to form a stable dispersion and thereafter removing water at a temperature of from about 20 to about 150° C. to yield an elastic crosslinked synthetic polyurethane plastic.

4. An aqueous dispersion of a self-dispersing polyurethane containing salt groups, said polyurethane being mixed with formaldehyde in an aqueous medium having a pH value of from about 2 to about 5 to form a stable dispersion.

5. The aqueous dispersion of claim 4 wherein the self-dispersing polyurethane is prepared by reacting an organic polyol with an organic polyisocyanate at least one of said reactants containing a tertiary nitrogen atom, in substantially stoichiometric quantities to prepare a polyurethane prepolymer and reacting said prepolymer with a member selected from the group consisting of a quaternization agent and an acid having a pK value of less than 6 to prepare said self dispersing polyurethane.

6. The aqueous dispersion of claim 3 wherein at least one chain extender is included in the preparation of said self-dispersing polyurethane.

References Cited

UNITED STATES PATENTS

| | | | |
|---|---|---|---|
| 3,242,230 | 3/1966 | Habib | 260—29.4 |
| 2,968,575 | 1/1961 | Mallones | 260—29.2 |
| 3,036,998 | 5/1962 | Rudner | 260—77.5 |
| 3,043,801 | 7/1962 | Wagner et al. | 260—77.5 |
| 3,087,912 | 4/1963 | Wagner et al. | 260—75 |

FOREIGN PATENTS

| | | |
|---|---|---|
| 880,485 | 6/1953 | Germany. |

MURRAY TILLMAN, *Primary Examiner.*

J. C. BLEUTGE, *Assistant Examiner.*